United States Patent
Wick et al.

(10) Patent No.: US 9,146,651 B1
(45) Date of Patent: Sep. 29, 2015

(54) DISPLAYING MULTIPLE APPLICATIONS ON LIMITED CAPABILITY DEVICES

(75) Inventors: Ryan Alan Wick, Apollo Beach, FL (US); John Marvin Jones, III, Overland Park, KS (US); Dhananjay Indurkar, Overland Park, KS (US); Jarrod Allen Nichols, Olathe, KS (US); Brandon Christopher Annan, Westwood Hills, KS (US); Raymond Emilio Reeves, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 915 days.

(21) Appl. No.: 12/502,765

(22) Filed: Jul. 14, 2009

(51) Int. Cl.
*G06F 3/048* (2013.01)
(52) U.S. Cl.
CPC ...................................... *G06F 3/048* (2013.01)
(58) Field of Classification Search
USPC ........................................................ 715/764
See application file for complete search history.

(56) References Cited

U.S. PATENT DOCUMENTS

| 5,920,313 A * | 7/1999 | Diedrichsen et al. ......... 715/767 |
| 2007/0143791 A1* | 6/2007 | Sammarco ..................... 725/38 |
| 2009/0031237 A1* | 1/2009 | Jessen et al. .................. 715/768 |

OTHER PUBLICATIONS

Java Midlets on the Pocket PC—the Complete Tutorial By Werner Ruotsalainen, Submitted Thursday, Mar. 16, 2006 Update (late 2007) http://www.smartphonemag.com/cms/blogs/3/java_midlets_on_the_pocket_pc_the_comple.*

* cited by examiner

*Primary Examiner* — Peiyong Weng

(57) ABSTRACT

A method, system, and media are provided for a combination of Java MIDlets, or applications, implementing a "View Port" concept, which allows the user interface of a mobile device to be leveraged for multiple tasks. The View Port provides access to multiple applications when previously interaction with only one application could be carried out at any one time. A View Port scheme also removes the need for two versions of a MIDlet, as a streamlined version of the application is no longer needed. This implementation allows legacy applications to function within the framework as well.

18 Claims, 9 Drawing Sheets

DISPLAYING MULTIPLE APPLICATIONS ON LIMITED CAPABILITY DEVICES

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In a first aspect, a set of computer-useable instructions provide a method of rendering multiple applications on a display of a wireless mobile computing device. The instructions allocate the entire area of the display to a user interface (UI), such that only one application controls the UI. A viewing application is initiated and executed, so that the viewing application receives control of the UI. A plurality of subsequent applications are executed. The viewing application is utilized to render at least a portion of the plurality on the display. This includes rendering the UI with two or more applications.

In a second aspect, computer-readable media cause a wireless computing device to perform of method of rendering a display via a user interface. A viewing application is initiated and executed through a user interface (UI) on the display. The UI and viewing application encompass the entire area of the display. A plurality of subsequent applications are initiated and executed. Through the viewing application, at least two subsequent applications of the plurality are rendered within the UI, such that at least a portion of the viewing application is still visible.

In a third aspect, a system is provided for displaying applications on a wireless computing device. The system includes a viewing component, a plurality of application components, and a registration component. The plurality of application components can be displayed by the viewing component. The registration component determines what application components are being executed and displayed.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
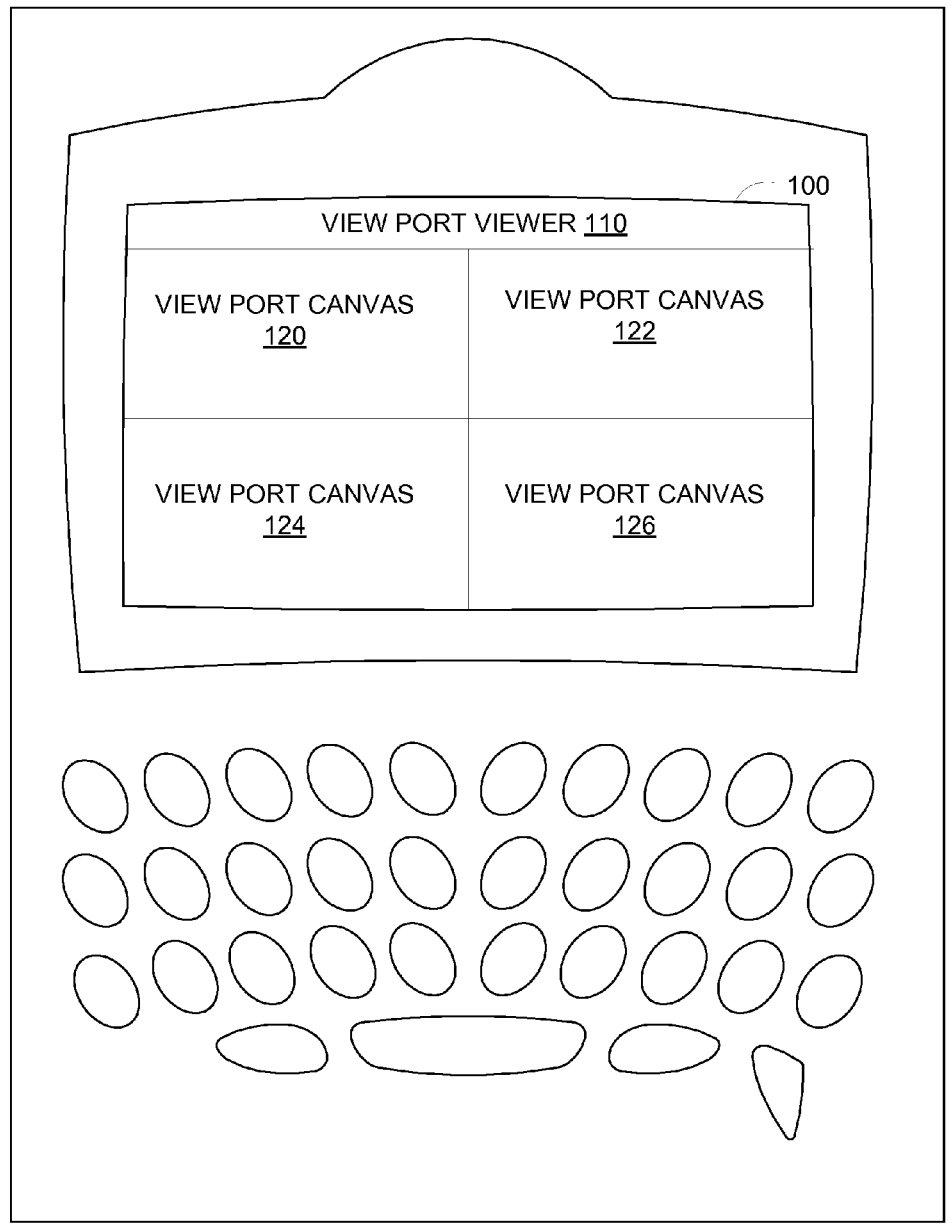
FIG. 1 depicts a block diagram of a mobile device display in accordance with an embodiment of the invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

A combination of Java MIDlets, or applications, implementing a "View Port" concept is one way that the user interface of a mobile device can be leveraged for multiple tasks. Among other things, a View Port provides access to multiple applications when previously interaction with only one application could be carried out at any one time. A View Port also removes the need for two versions of a MIDlet, as a streamlined version of the application is no longer needed. This implementation allows legacy applications to function within the framework as well.

As described further herein, this View Port MIDlet combination includes Canvas, Registrar, and Viewer components. The components will operate with multiple View Port Applications to provide display and interaction with those applications. Each is implemented such that legacy applications can be minimally modified for compatibility, if any reconfiguration is needed at all. With the use of the View Port Viewer, a user can see multiple applications on a mobile display screen at once. The Viewer has different areas allocated for the various applications that are active using different View Port Canvas areas. Using the global View Port Registrar, the Viewer can be made aware of application activities, which further extends device tasks.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

API Application Programming Interface
CLDC Connected Limited Device Configuration
LCDUI Limited Capability Device User Interface
GUI Graphical User Interface
JAR Java™ Archive
JCP Java™ Community Process
JSR Java™ Specification Request
MIDP Mobile Information Device Profile
ODP On Device Portal
OS Operating System
PDA Personal Data Assistant
UI User Interface
VPA View Port Application
VPC View Port Canvas
VPR View Port Registrar
VPV View Port Viewer Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Many mobile devices today, such as cellular phones, personal data assistants (PDAs), and devices that combine phone and PDA functionality, use the Java™ Platform Micro Edition (Java™ ME) framework as an underlying platform. This framework is prevalent for use with devices that are unable to take full advantage of other platforms such as Java Standard Edition, because of resource limitations. The most common limitations include reduced memory capacity, interface limitations, and the like. The descriptions below will be understood for their applicability for execution within a Java ME-compliant environment.

Despite the resource constraints of the devices that implement the Java ME platform, each edition of the Java ME framework must meet standards that are regularized in response to a Java Specification Request (JSR). Through the Java Community Process (JCP), updated versions, optional packages, and newly found needs can be codified. Basic and optional specifications allow users foundational device capabilities, as well as the ability to take advantage of a myriad of other services. Descriptions contained herein of media, methods and systems leverage these standardized packages.

Included in these specifications are application programming interfaces (APIs) that enable some of a device's basic operations, such as its input and output interactions, file saving behaviors, and user interface execution. The Java ME specifications also enable higher-level functions, such as web browsing, secure and trustworthy web connections, and wireless online payments. Other optional packages stem from the combination of cellular phones and personal data assistants (PDAs) with previously separate devices, such as cameras, music players, and global positioning system (GPS) devices.

One example of a lower-level specification for the Java ME environment is the Connected Limited Device Configuration (CLDC). The CLDC is standardized in version 1.1 in the JSR-139 specification. The full text of the JSR-139 specification is herein incorporated by reference. This API specification enables basic input/output, math and systems functions, as well as lower and higher level data types/classes. CLDC contains several libraries of APIs to carry out these and other tasks. Examples include the java.lang library and streamlined versions of java.io and java.util.

Several specifications build further functionality on top of the CLDC, despite being themselves fundamentally basic APIs. One exemplary collection is the Mobile Information Device Profile (MIDP), for which the JSR-118 specification standardizes version 2.0. The full text of JSR-118 also is incorporated by reference herein. The MIDP specification includes more specialized interfaces for multimedia playback, gaming, and secure internet connections. However, JSR-118 includes basic functions as well, such as the javax.microedition.lcdui for the graphical user interface. Another is the javax.microedition.midlet library that provides basic parameters for Java ME applications.

The Limited Capability Device User Interface (LCDUI) portion of the MIDP specification defines objects, classes, and commands that control the UI. This library sets forth display items that are ordinarily found in GUIs of this nature, which are called Displayables. There are a number of subclasses of Displayables, which include Alert, Canvas, Form, List, Screen, and Textbox among others. These interface functions allow the UI to render common display features, draw and redraw graphics, and place text and images where called.

As an example, the low-level commands of Canvas allow for an application to consume an area that is just smaller than full screen. This permits reservation for mobile-device-specific items like screen titles and indicators around the graphics. When needed, such as for game applications, Canvas can render full-screen graphics that consume all of the available display. Regardless of whether or not there is reservation of space for system tools, according to the specification the display will be consumed at a given time by only one application.

MIDlets are Java applications operating within the parameters of the MIDP specification. The applications are specified in JSR-118 so as to allow more than one application to share device resources, even though only one may be displayed. MIDlets can be provided as a single application in a Java Archive (JAR) file. Alternatively, more than one application can be packaged together in a single JAR file. When packaged together in one file, the collection is a group called a MIDlet suite. The MIDlet model standardizes the interaction between the application(s) and the device's run-time environment. These applications are created, started, paused, and removed by a management component, which also handle errors as defined in the MIDP specification.

The above and below disclosure will outline a suite of MIDlets that enable viewing and interacting with multiple applications at the same time. One MIDlet, the View Port Viewer, provides the mechanism for displaying the multiple applications, each with its own View Port Canvas. Each View Port Application will then provide graphics to the VPV, while receiving mode changes, key events, and pointer events from the Viewer MIDlet.

According to the media, systems, and methods described herein, the Canvas design of MIDP can be extended to create a View Port Canvas. By extending the existing design, the development process is simplified, as is the conversion of existing applications to support a View Port scheme. Where the conventional Canvas component simply allocates an area that is a full-screen display (or system areas and the remainder of the screen), View Port Canvas builds added capability that allows areas to be resized by the Viewer (VPV) MIDlet. This occurs dynamically by retrieving height and width information, then placing responsibility within the View Port Application to draw itself according the information supplied. This information can be used to create a buffer outside of which attempts to draw graphics will be ignored. By creating a buffer, attempts to render graphics outside the display area will not needlessly consume device resources.

Not only are different sizes available through a View Port scheme, but changes can take place for the size of each VP Canvas even after they have been rendered. The Viewer sends to a VPC the needed information to effectuate changes in the area to which graphics will be drawn. This is accomplished through a size-changed function. The ability to resize the VPC allows the View Port scheme to extend the capabilities of applications to call upon other applications. In other words, one VPA can receive graphics and information from another VPA when necessary.

The extended VPC component can receive from the Viewer input events, as well as visibility and focus awareness information. The input events supported by Canvas, such as key events and pointer events, are likewise supported in the VPC component. The Viewer can send information to the View Port Canvas through pressed, released, repeated, and dragged commands. Because the Canvas design of JSR-118 specification provides awareness of whether or not an application's canvas is currently visible, a VPC also includes notification capabilities.

Unlike the typical LCDUI design, a View Port Canvas has the capability to denote which application has focus on the canvas. Whether or not an application has focus is something that previous iterations of the LCDUI did not need to address. With a single application consuming the entire display, the application with focus was of little consequence, only visibility awareness was. However, once the interface is extended to concurrently display multiple applications, it can be useful to provide more information to the user about which application is active. There are a number of different ways this can be implemented, such as changing the appearance of the application once a focus-gaining function has been invoked. Alternatively, audio controls could be enabled when focus is gained, and disabled when a focus-lost function is called. In the implementations described herein, the VPV notifies the VPC of focus state through these functions.

The VPV MIDlet is the application that allows a mobile device user the ability to actually see and use more than one application at a time. There are a number of different ways this can be accomplished, so the particular implementation of the Viewer MIDlet is not confined to a single embodiment. For example, in some embodiments the VPV can be a transparent application that simply renders portions of the screen for each active application. Receiving information from a Registrar, which will be discussed in further detail below, the VPV can simply apportion screen space for some or all of the active applications on the device. Other embodiments can create an inset in a viewer, reserved for two or more canvases. Yet another embodiment is the rendering of canvas space within the application, so that "picture-in-picture" type functionality is present for applications to call on other applications.

An exemplary implementation can be a Viewer that scans a list of active View Port Applications and creates up to four View Port Canvases accordingly. In the event only one VPA is active, the Viewer can automatically allocate a full-screen VPC. Once another application is active, the VPV can divide the screen into two equal portions, or into unequal divisions according to a predetermined allocation. As a subsequent third or fourth application is initiated, the Viewer creates new VPCs to further divide the allocated screen space. Additional applications would not necessarily all be visible, but could be selected when needed. Area could be reserved adjacent to the Canvas(es), that allows for the activation and/or selection of available VPAs. The selection of four VPAs is merely illustrative in nature and should not be construed as limiting the invention to that number of concurrent, visible applications.

Now describing FIG. 1, a simplified block diagram is shown of a View Port display 100, which is part of an unnumbered mobile device, with multiple VP Canvases shown. View Port display 100 has a View Port Viewer area 110 shown across the top portion of the display. This could be an actual application area reserved for the VPV. Much like any other application that has a full-screen display mode, this can include functions related to the operation of the viewer, such as available commands and actions, pertinent information about the applications that are being displayed, or the like. Alternatively, the area shown can be the area of the screen dedicated to the minimum area needed for display of the operating system of the device. For example, some devices may employ an operating system that uses a tool bar or a start-up area.

VP Canvases 120-126 are shown each taking up one-fourth of the remaining area of the display in a two-row, two-column configuration. This specific diagram should not be construed as a limitation on the invention, but is an example of just one potential configuration with four running applications. Alternative displays are possible. For instance, the running applications can be displayed as horizontal or vertical slices. In an exemplary "sliced" case, if the display area is rectangular and one dimension is relatively larger than the other, the VP Canvases could be configured to take advantage of the disproportionate dimension, i.e. divided in the direction of the larger dimension.

Figure 2:
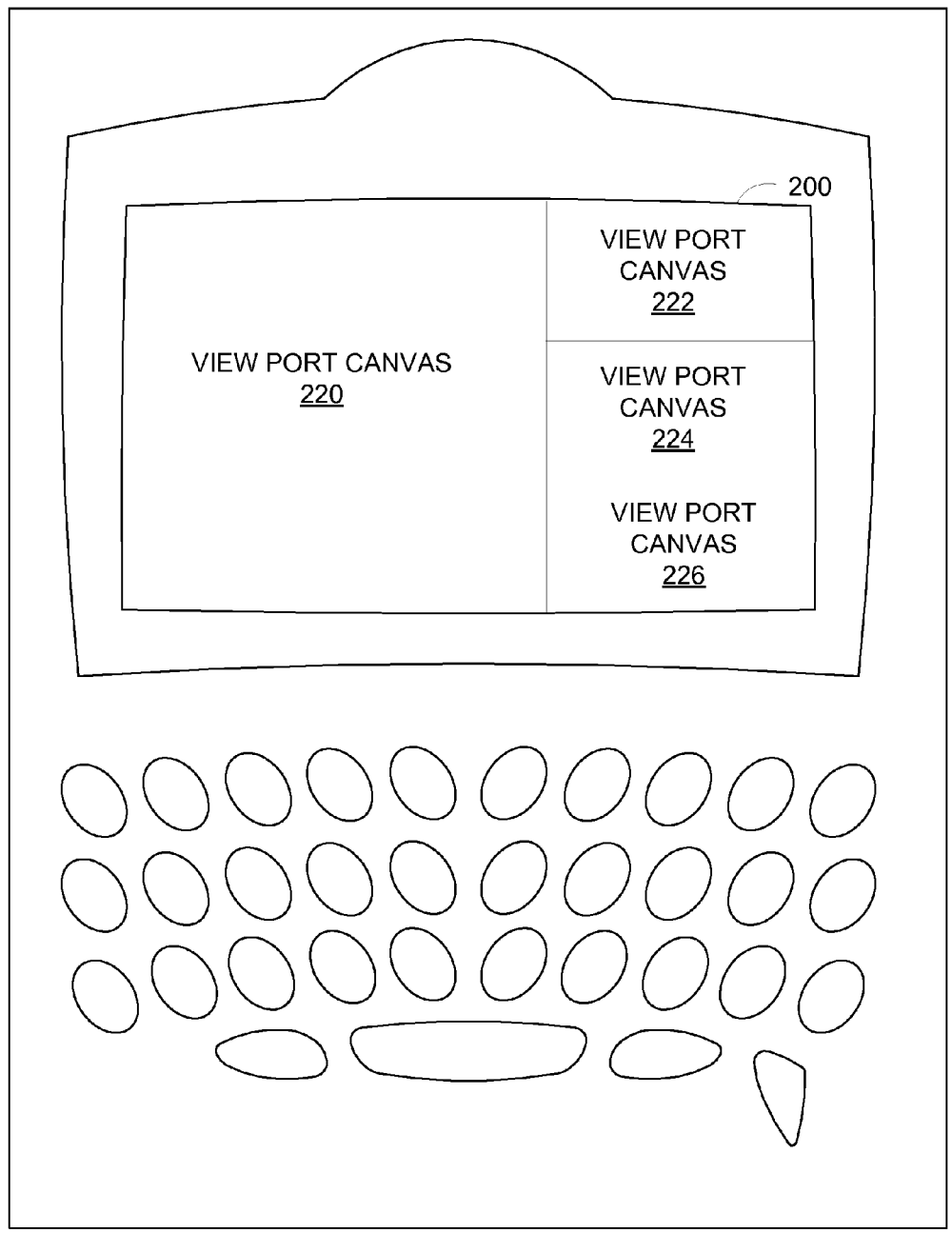
FIG. 2 depicts a block diagram of an alternative mobile device display in accordance with an embodiment of the invention.

An alternative embodiment is shown in a FIG. 2, which depicts a display 200. In this figure, the screen looks much the same. In FIG. 2 there is no View Port Viewer area. Also different, VPC 120, rendered as the left half of the display area, is much larger than the other three VPCs. This larger display of VPC 120 can be used as an indication that VPC 120 has operating system focus. Other configurations are possible, such as enlarging whichever application has focus regardless of position among the four VPCs, but maintaining the same relative position (e.g., top left, bottom right, etc., as seen in FIG. 1). A larger View Port Canvas could be positioned in the center with other VPCs rendered around it. As mentioned previously, more or fewer canvases may be possible, thus creating other possibilities for configuration.

One aspect of the embodiments described above and below is the capability of the View Port Canvases to be exposed either through a separate View Port Viewer application that has its own look and feel, or through the device's native operating system. This allows the rendered applications to either appear as a Java application when viewed through the VPV, or to appear to be similarly executed to native applications when exposed through the operating system. Thus, flexibly the VPV can give the device a specific interface for an On Device Portal (ODP) function or not.

Each of the exemplary components shown above can interact as part of a MIDlet container, or group of MIDlets operating together to provide functionality. In the exemplary case of a described container below, the various View Port Applications provide information to the View Port Viewer with regard to graphics, key events, pointer events, and mode changes. Some MIDlets may have only key events as valid inputs, others may only accept pointer events, and still others will accommodate both forms of input. Each VPA will communicate this information, among other things, to the Viewer MIDlet. Mode changes, for example from full-screen mode to partial-screen mode or vice versa, can be communicated. Graphics that are to be rendered will also be shared by a VPA with the Viewer MIDlet.

Figure 3:
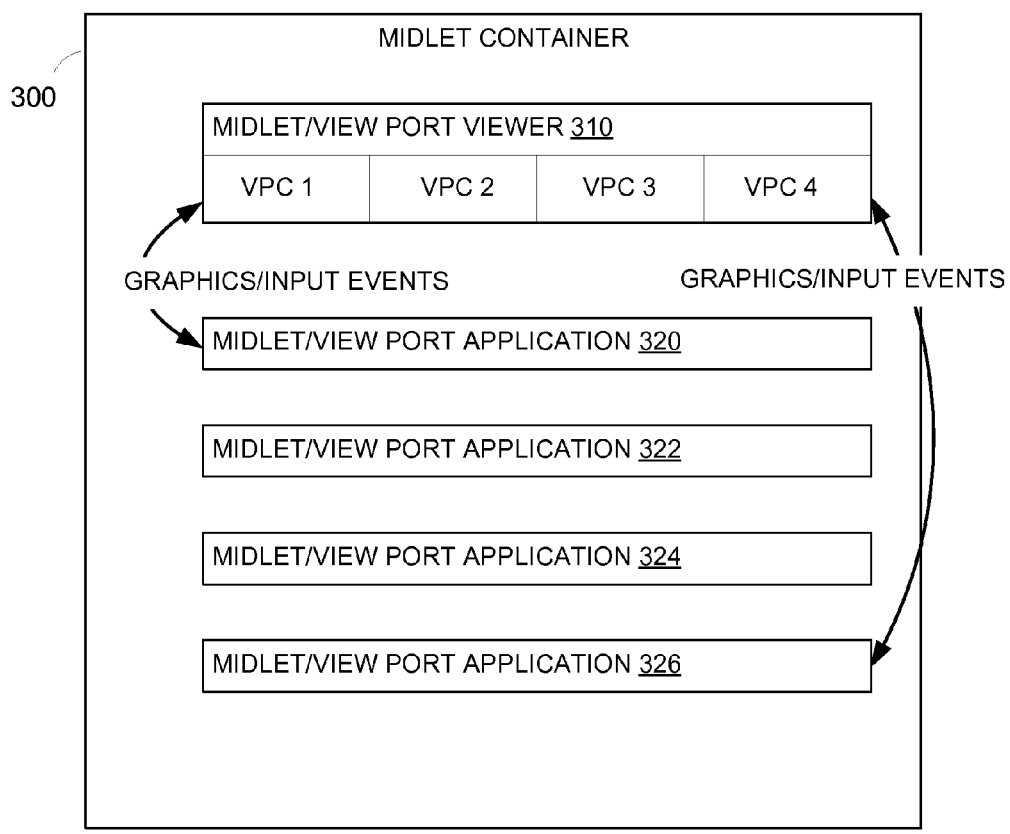
FIG. 3 shows a block diagram of a MIDlet container in accordance with an embodiment of the invention.

Turning to FIG. 3, a block diagram in accordance with an embodiment of the invention is shown representing a MIDlet container 300. Container 300 contains a View Port Viewer Midlet 310 and four exemplary View Port Application Midlets 320, 322, 324, and 326. The types of MIDlets or the specific applications instantiated by VPAs 320-326 should not be construed as a limitation on the embodiments of the invention. Again, neither should the number of VPAs included be interpreted as necessary for practicing the invention. Instead, simply a plurality of applications can and will be able to interact within the MIDlet container.

High-level interaction of these component parts is represented in the diagram as VPV 310 receives information from VPA 320, denoted by the arrows on the left side of the diagram. The flow of information includes VPA 320 sending the dimensions and location of the canvas or canvases to be rendered along with the necessary graphics. The types of input events supported (e.g., keyboard, pointer, both) will be part of the communication between the VPAs and the Viewer MIDlet as also denoted by the arrows. Along the right side of the diagram is a similar line representing the flow of data between VPA 326 and VPV 310. For clarity of the drawing figure, only two sets of lines is shown noting the transfer of information. In practice, each of MIDlets 320-326 can exchange information with VPV 310. As further described below, VPA 320 can pass along information to allocate space for a second VPC within its own canvas, receiving graphics and other input information from another VPA to render within that area. Therefore, there can be information exchange between VPAs as needed.

Another aspect of this arrangement is the capability to interface existing Java applications within the framework. Legacy applications that were not intended for View Port functionality can be displayed through the VPV full screen mode. Alternatively, by simply rendering what portion of the canvas is allocated to the application, the VPV could effectively crop the application to a partial rendering. The VPV will discard information not needed for the particular view of the application that is shown, thus freeing system resources by avoiding needless instruction to render graphics that are not visible. Either way, older Java ME applications can be integrated easily.

The legacy integration is contrasted with newer applications that can be developed with the View Port model in mind. Thus, applications designed specifically for functioning as a VPA can have more advanced code taking advantage of the extended capabilities of the framework. An exemplary difference would be instructions to operate in full-screen mode and having a separate interface to operate in a VPA mode. Alternatively, a VPA could be coded for full-screen mode and have specific code on how partial views of the application are shown when in VPA mode. Yet another embodiment of enhanced VPA MIDlets involve the use of a full-screen mode interface and the simple reduction to canvas size when in VPA mode. Other differences can involve how the keyboard and pointer events are exposed, because more than one application may be able to provide such input at once. Still others differences involve the data associated with application focus, which was previously not needed with a single-application display.

One way to implement a View Port scheme includes provision of a global View Port Registrar. Registration to this component can, but need not, be automatic for VPAs so that the Viewer can access data helpful for rendering the one or more MIDlets. This can be bypassed to allow for application-selected registration, because many of the applications can be capable of executing as a View Port Application or as a standard MIDlet. Implementations of the Registrar can vary. A likely minimum of data needed will be an application name, minimal height and width of a Canvas, and whether or not the VPA supports pointer or key events. Other information could be passed from the application to the Registrar, depending on the complexity with which the VPR is intended to operate.

A MIDlet follows a life cycle, including definition of at least the states that are set forth in JSR-118. Because VPAs derive their basis from this design, their states and cycles would meet at least this minimum specification as well. The notification of those states to the management component, as well as how state changes are requested, are mandated by the specification in JSR-118. There may be more states defined specific to a particular device. At a minimum, however, there are Active, Paused, and Destroyed states for a MIDlet. The transitions between states are also defined in the specification.

In a View Port Registrar, the states can be extended to account for an application's ability to execute as a "normal" MIDlet or as a VPA, as well as the full-screen or split-screen modes of the Viewer. Rather than the three simplistic states, more become apparent from the different modes available. Thus, Destroyed and Paused states are still relevant, but the Active states are further defined. For instance, there could be a Full Active mode for applications running in full-screen mode. Likewise, there could be a VPA Active mode for applications running so that they are rendered to a VPC of less than the full screen. Hidden Active or Invisible Active mode could be use for applications that are still executing in the platform, but are not visible anywhere on the UI. While examples are given, other modes could be contemplated and still fall within the scope of this disclosure.

Figure 4:
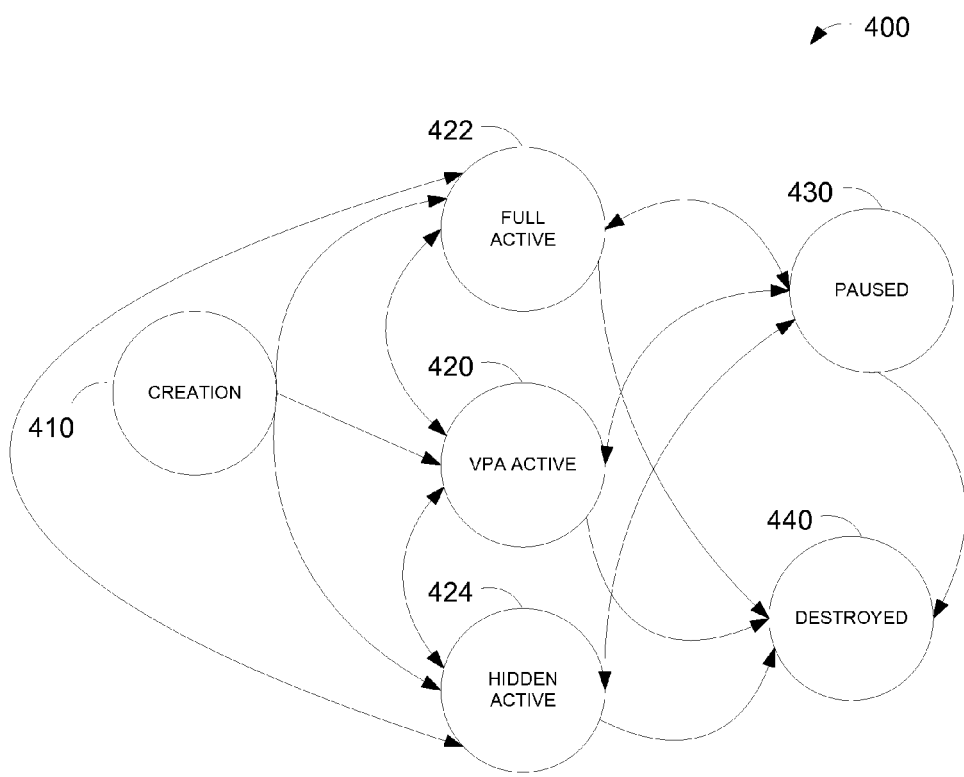
FIG. 4 shows a diagram of a representation of states in an exemplary View Port Application life cycle.
Figure 5:
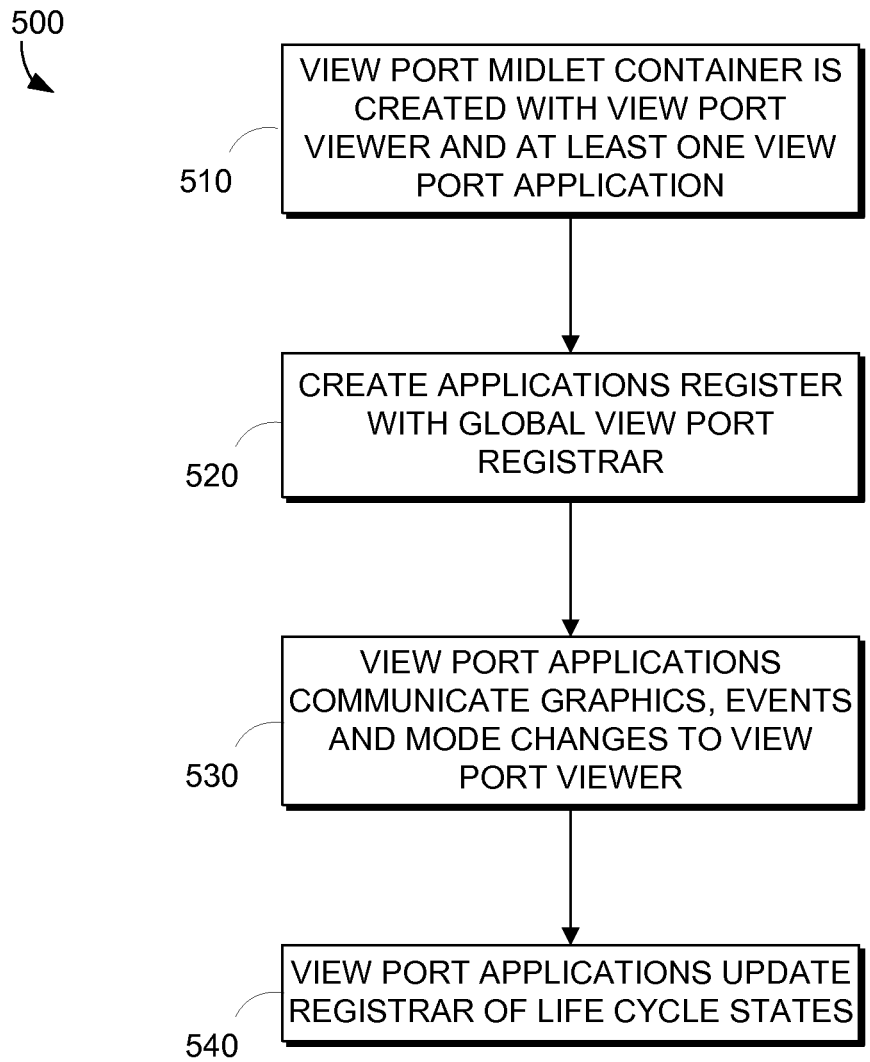
FIG. 5 depicts a flowchart representing a transfer of data in accordance with an embodiment of the invention.

FIG. 4 is now described, which depicts a flowchart representing a lifecycle of View Port MIDlet applications 400 in accordance with an embodiment of the invention. A creation state 410 shows the point at which an application is created and therefore registered with the View Port Registrar. This follows the JSR-118 specification as the application creation is standard. From creation the VPA can enter one of three states, VPA Active 420, Full Active 422, or Hidden Active 424 states.

There are several states to which an application in the VPA Active 420 state can transition. It can enter one of the other active states (Full Active 422 or Hidden Active 424), or it can enter a Paused state 430 or Destroyed state 440. The Paused state 430 temporarily suspends the application's ability to control device resources. Destroyed state 440 terminates the application altogether.

FIG. 4 shows several of the transitions between states with arrows on each side. This denotes that the transition can be from one state to the other or vice versa. For example, any of the active states can transition to any other active state and back again. Likewise, any active state can transition to Paused state 430, while Paused state 430 can transition to any of the active states. The only one-way transitions are from Creation state 410 to whichever active state is created, and from any state to Destroyed state 440. Once the application transitions to Destroyed state 440, the application has released control of all device resources, or failure to do so creates an exception that causes resources to be released regardless. Thus, a return to an active or paused state is not possible from Destroyed state 440.

The use of a View Port Canvas and View Port Application can be used to enable one application to render another application within its display. In this way, a View Port Application can itself become a View Port Viewer and process the second VPA accordingly. As an example, a "friend locator" application could use the functionality of an address book application and a global positioning satellite (GPS) system application. A user's friends who allow their mobile phones to provide GPS coordinates to the application can be shown on a map. The address book application can render a portion of the display area for a VPC for the map. The address book VPA would therefore, become the Viewer and the GPS application would be the application rendered within the specified area.

There are a number of applications within a mobile-device display context that could render an area within one VP Canvas to create a second VPC. The GPS example above could be applied to a number of other applications. Likewise, a contacts list or address book could share its functionality or draw on other application in a number of ways. Thus, the address book can be rendered within another application or render another application within its Canvas. Applications for using other assorted advanced technologies on a mobile device, such as picture, music, or video applications, could be useful. Likewise, specific applications for particular information—weather, stock prices, and sports results as examples—could easily be integrated into a small display area.

Figure 6:
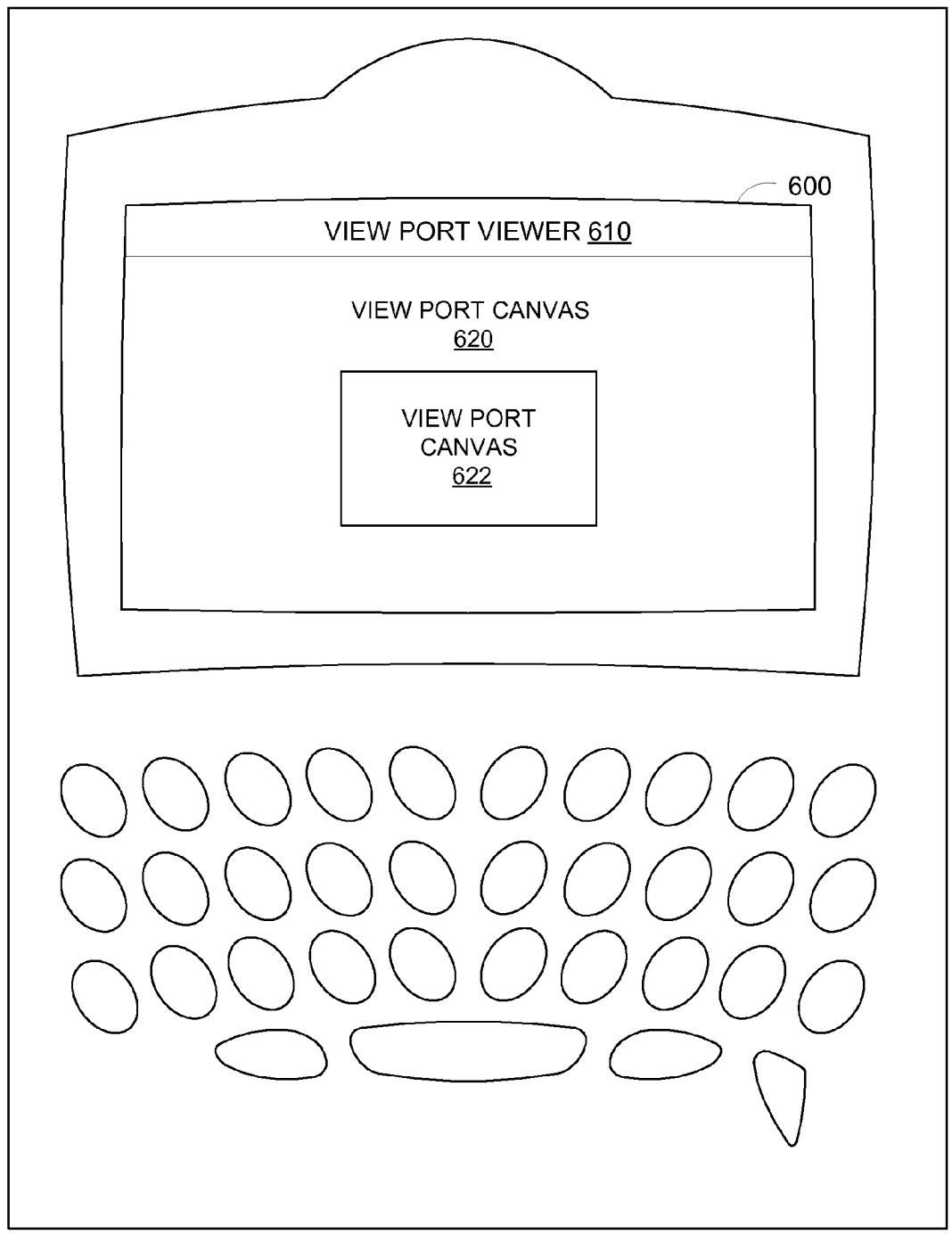
FIG. 6 shows a block diagram of a mobile device display of an application rendering a canvas within the application.

FIG. 6 shows a block diagram of an exemplary mobile device display 600 of a first application rendering a View Port Canvas 622 of a second application within a VP canvas 620 of the first application. The underlying MIDlets of mobile device display 600 operate in the manner as described previously and a Viewer area 610 is shown. Thus, VPCs 620 and 622 are the canvas renderings of two VP Applications working in a MIDlet container that also includes VPV 610.

There are at least two possible mechanisms for the operation of these MIDlets. The first involves a separate VPV MIDlet 610 allocating space for VPC 620 and separately allocating space for VPC 622 as part of an overall viewer application. If no VPV 610 were depicted, as was the case in the description of FIG. 2 above, the VPA rendering VPC 620 can act as the Viewer, and therefore render a portion of its own canvas as VPC 622.

As shown in FIG. 6, VPC 620 is a larger canvas and contains VPC 622. This could be a display as outlined in the example above, where the friend locator application within an address book VPA renders VPC 620. The GPS application would supply the data used to render VPC 622. Thus, a friend within a contact list on VPC 620 can be shown on a map on VPC 622. Conversely, if the GPS application rendered VPC 620, the map could be the predominant image and the address book could supply contact information on the screen in the smaller VPC 622, pointing to the friend's location.

Figure 7:
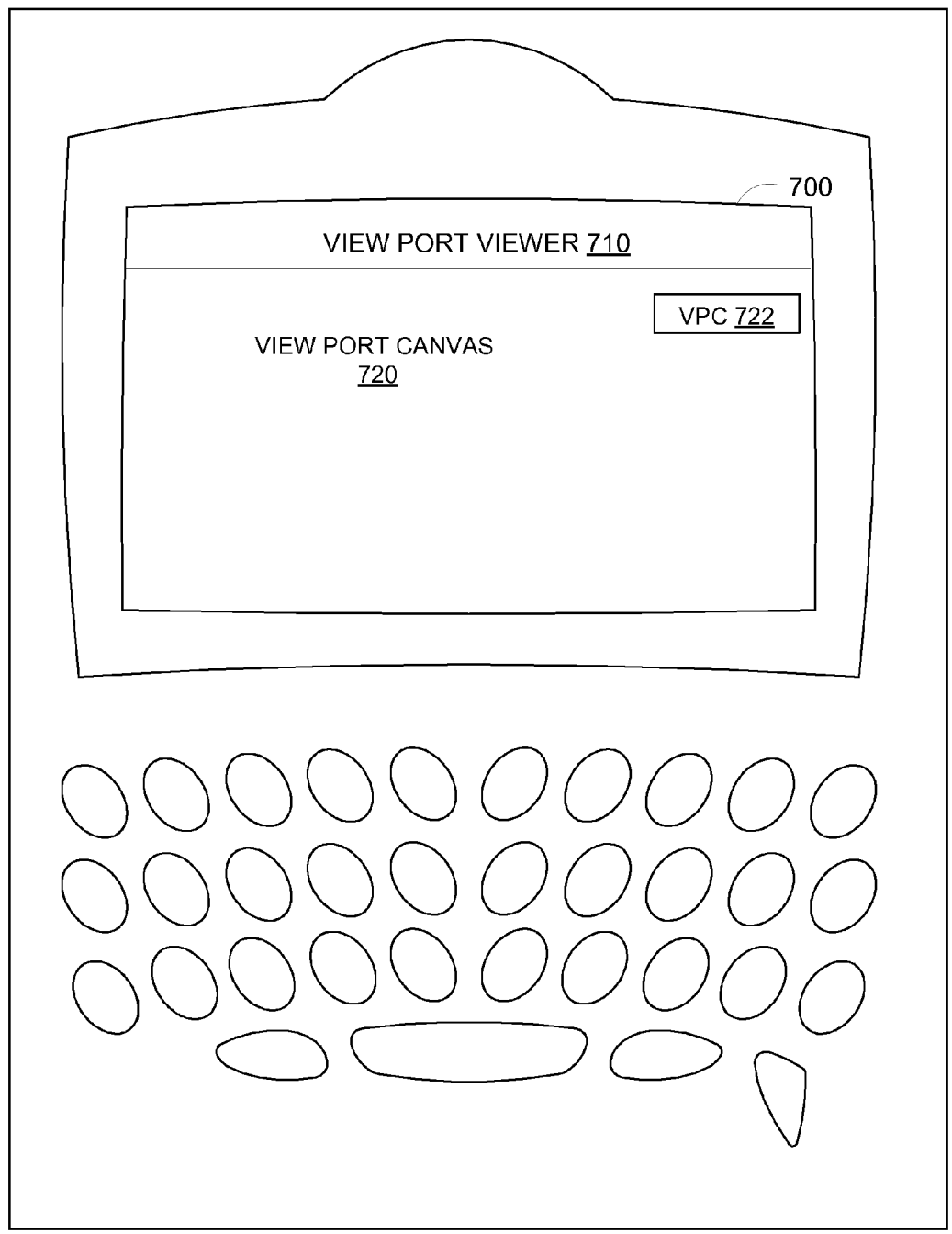
FIG. 7 shows a block diagram of an alternative mobile device display of an application rendering a canvas within the application.

As an alternate embodiment, FIG. 7 shows a block diagram of a mobile device display 700 of an application rendering a VPC 720 with a second VPC 722. In this exemplary display, the secondary VPC is much smaller and located in a corner of the display. This can be because of the interaction between the two VPAs, or because of the type of information being shown (for instance a relatively static and small-to-display temperature reading). VPC 722 can also simply show enough of a VPA to discern what that VPC is representing, and a way to enlarge the contents of the canvas. For instance, in a two-application mode, a user may be able to toggle between two applications.

Figure 8:
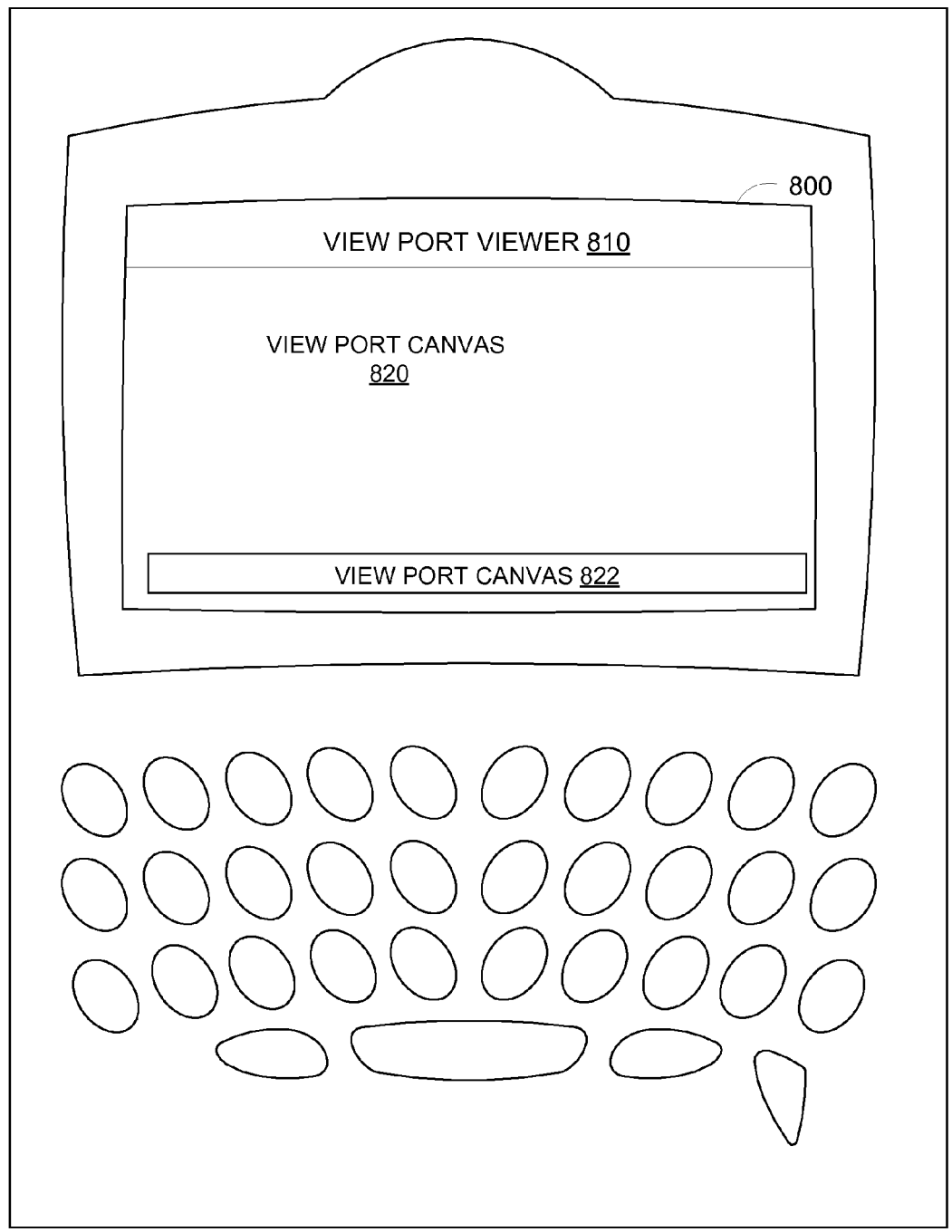
FIG. 8 depicts a block diagram of a mobile device display of an application rendering another alternative application canvas within the application.

As yet another alternative embodiment, FIG. 8 shows a View Port Canvas 822 that is along the bottom of a View Port Canvas 820. Again by example only, this could be business application that scrolls stock prices along the bottom of the screen if so desired. As another example, VPC 820 could be a sports viewing application, such as a professional sports "game cast," and VPC 822 can continuously provide the display with score updates of the particular league from which the gamecast is selected.

With the use of the global registrar, a View Port implementation always monitors the current state of VPAs and what is seen on the display. Therefore, as each VPA is created, it is added to the registrar's list along with its current state. As mode changes occur, that information is passed to the viewer as needed, as well as to other VPAs. The continued execution of VPAs becomes an iterative process, with checks of what VPA is shown or not, to what dimensions, which has focus, and other pertinent information.

Figure 9:
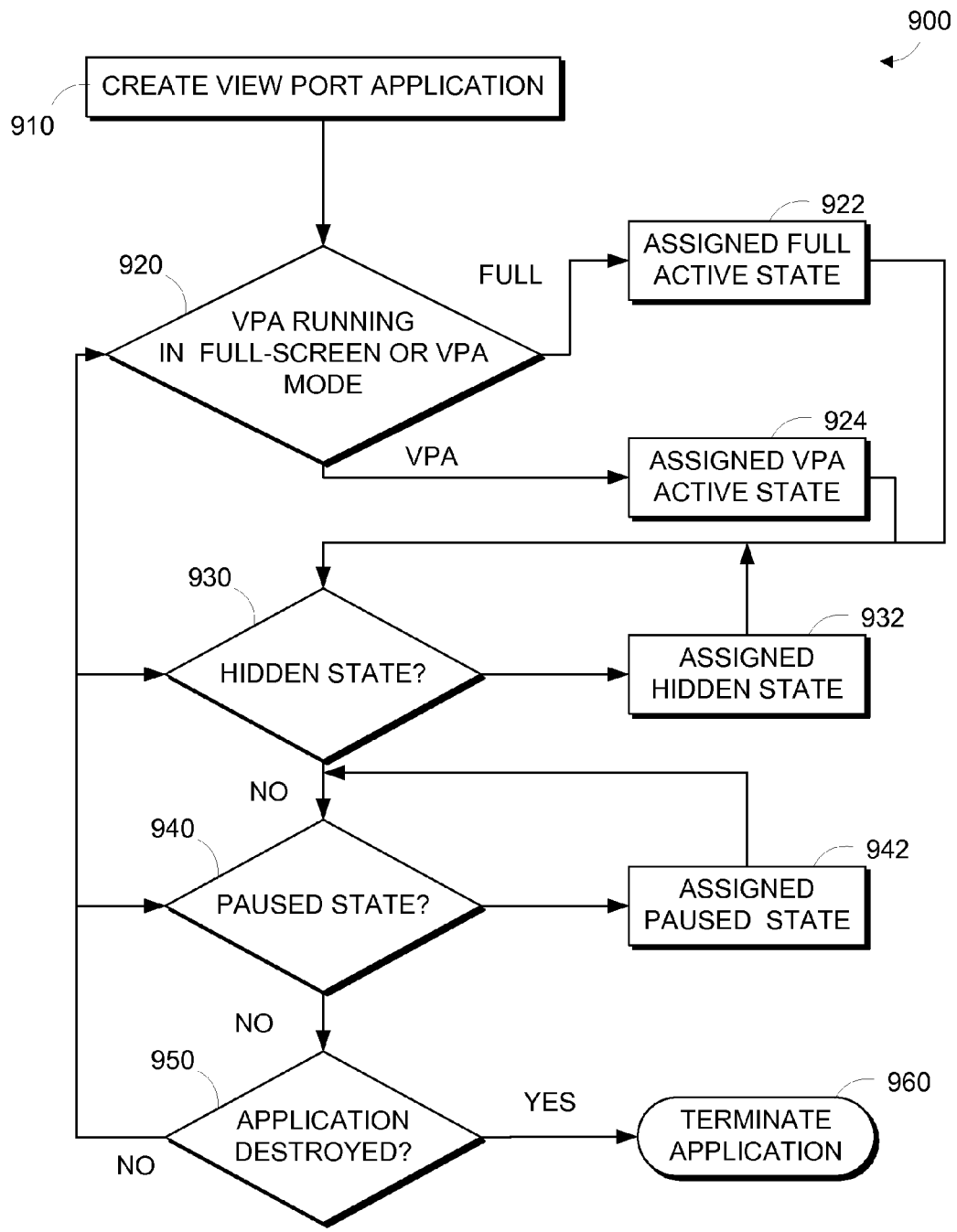
FIG. 9 shows a flowchart representing a method of rendering a display on a mobile device according to an embodiment of the invention.

Turning now to a FIG. 9, a flowchart is shown representing a life cycle 900 of a theoretical VPA. At a step 910, a Java MIDlet is created that will have some or all of the display area. At a step 920, a determination is made as to whether the MIDlet is operating as a full-screen MIDlet or if it is operating as a View Port Application. If the MIDlet is operating full screen at step 920, then the MIDlet is assigned a Full Active state by the View Port Registrar at a step 922. On the other hand, if it is operating as part of a VPV, then the MIDlet is assigned a VPA Active state at a step 924.

At a step 930, a determination is made as to whether the application has been paused. If so, at a step 932 the VPR assigns the application a state of Paused, and continues back to step 930. If it has not, a determination is made at a step 940 as to whether or not the display characteristics of the application have been hidden. If the application has been hidden, at a step 942 the VPR assigns the VPA a Hidden Active state and returns to step 940. If the application has not been hidden by further manipulation, then the registrar proceeds with the method.

At step 950, a determination is made as to whether or not the application has been destroyed. If not, the registrar returns to the appropriate state and continues to monitor the VPA. If it is destroyed, the application terminates at a step 952.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, cause a wireless mobile device having a display to perform of method of rendering multiple applications on the display, the method comprising:
   allocating, on a wireless mobile device, the entire area of a display on the wireless mobile device to a user interface (UI), the UI being controlled by a single application;
   initiating and executing a Java viewing application, the Java viewing application receiving control of the UI;
   executing a plurality of subsequent Java applications on the wireless mobile device, wherein the Java applications can receive graphics and information from another Java application allowing one of the Java applications to become the viewing application and process the second accordingly; and
   utilizing the Java viewing application to render at least a portion of the plurality on the display, wherein one of the respective two or more Java applications is rendered within another of the respective two or more Java applications.

2. The media of claim 1, wherein the method further comprises registering each application of the plurality with a viewing application registrar.

3. The media of claim 2, wherein the method further comprises interfacing input components for the plurality with the viewing application, such that more than one application can provide input to the viewing application.

4. The media of claim 3, wherein the input components can be one or more of keypad events, pointer events, or touchscreen events.

5. The media of claim 3, wherein the viewing application and each application of the plurality are Java midlets.

6. The media of claim 5, wherein the Java midlets are compatible with the Java Micro Edition (ME) standard.

7. The media of claim 6, wherein the Java midlets require no modifications to be viewed within the viewing application.

8. One or more non-transitory computer-readable media having computer-executable instructions embodied thereon that, when executed, cause a wireless device to perform of method of rendering a display via a user interface, the method comprising:
    initiating and executing, on a wireless device executing a Java Platform Micro Edition framework, a Java viewing application through a user interface (UI) on a display of the wireless device, the UI and the Java viewing application encompassing the entire area of the display, and capabilities of the wireless device being insufficient to execute a Java Standard Edition framework;
    initiating and executing a plurality of subsequent Java applications; and
    through the Java viewing application, rendering at least two subsequent Java applications of the plurality within the UI, the Java viewing application rendering one Java application of the plurality within a second Java application of the plurality.

9. The media of claim 8, wherein the method further comprises registering each application of the plurality with a viewing application registrar.

10. The media of claim 9, wherein the viewing application and each application of the plurality are Java midlets.

11. The media of claim 10, wherein the Java midlets are compatible with the Java Micro Edition (ME) standard.

12. The media of claim 11, wherein the Java midlets require no modifications to be viewed within the viewing application.

13. The media of claim 12, wherein the method further comprises interfacing input components for the plurality with the viewing application, such that more than one application can provide input to the viewing application.

14. The media of claim 13, wherein the input components can be one or more of keypad events, pointer events, or touchscreen events.

15. A system for displaying applications on a wireless device, the system comprising a wireless device executing a Java Platform Micro Edition framework, resource limitations of the wireless device preventing the wireless device from executing a standard Java framework, the wireless device executing:
    a viewing component that renders one Java application of a plurality of Java application components within a second Java application of the plurality;
    the plurality of Java application components being executed by the wireless device and being displayed by the viewing component, wherein the Java applications can receive graphics and information from another Java application allowing one of the Java applications to become the viewing component and process the second accordingly; and
    a registration component that determines what application components are being executed and displayed, displaying of the plurality of application components including displaying the plurality of application components simultaneously, and, without the viewing component, the wireless device having resource constraints that otherwise limit displaying of the plurality of application components to a single application component of the plurality at a time.

16. The system of claim 15, wherein the viewing component renders the plurality of application components natively within an operating system's display.

17. The system of claim 15, wherein the viewing component renders the plurality of application components within a separate application display.

18. The system of claim 15, wherein the viewing, registration, and application components are compatible with the Java Micro Edition (ME) standard.

* * * * *